United States Patent [19]
Tamllos

[11] Patent Number: 5,794,899
[45] Date of Patent: Aug. 18, 1998

[54] HUNTING TRIPOD

[76] Inventor: George Michael Tamllos, 310 N. Main St. P.O. Box 6, Vernon, Utah 84080

[21] Appl. No.: 683,901

[22] Filed: Jul. 19, 1996

[51] Int. Cl.$^6$ ............................................. F16M 11/00
[52] U.S. Cl. ..................... 248/166; 248/171; 248/188.2
[58] Field of Search ................................ 248/166, 170, 248/171, 173, 167, 168, 163.2, 181.1, 188.2, 179.1

[56] References Cited

U.S. PATENT DOCUMENTS

| | | | |
|---|---|---|---|
| 1,894,695 | 1/1933 | Ley | 248/171 |
| 2,168,988 | 8/1939 | Hultquist | 248/181.1 |
| 3,312,432 | 4/1967 | Pfeiffer et al. | 248/188.7 |
| 3,863,376 | 2/1975 | Dalmaso | 248/166 |
| 5,072,910 | 12/1991 | May | 248/188.2 |
| 5,402,595 | 4/1995 | Tamllos | 42/94 |

*Primary Examiner*—Victor N. Sakran

[57] ABSTRACT

The present invention relates to a tripod assembly for use in conjunction with a firearm. However, the present invention could also be used in conjunction with any other instrument which require precise mounting upon a portable and easily erectable apparatus. In its broadest context, the present invention includes a tripod comprised of a bipod member and a tripod member. In this manner, of the present invention can be employed with either two or three legs. Furthermore, the tripod of the present invention also includes a vice type mounting member which allows the tripod to be used in conjunction with a variety of firearms.

3 Claims, 5 Drawing Sheets

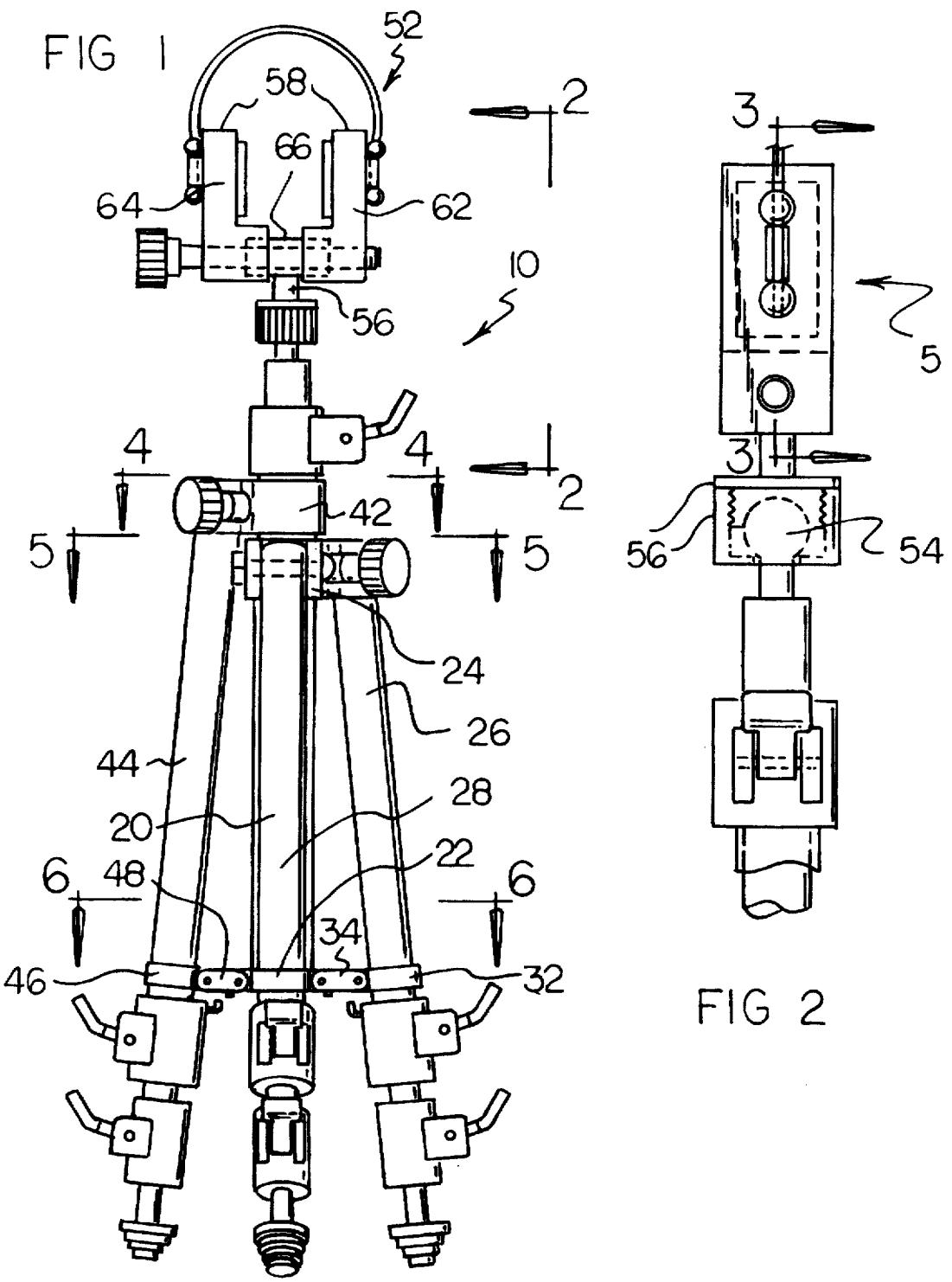

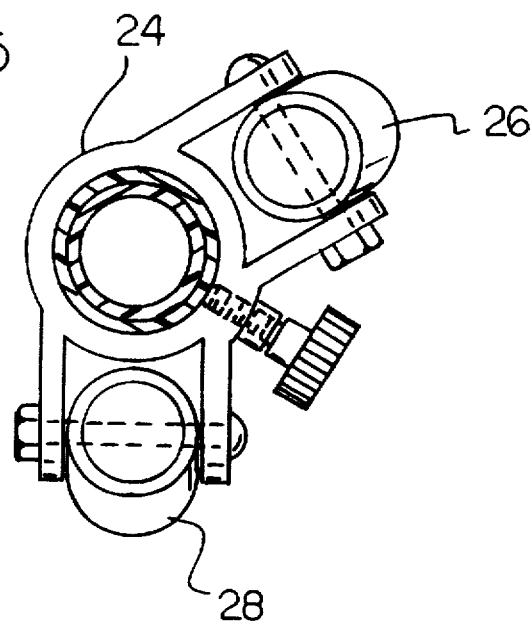
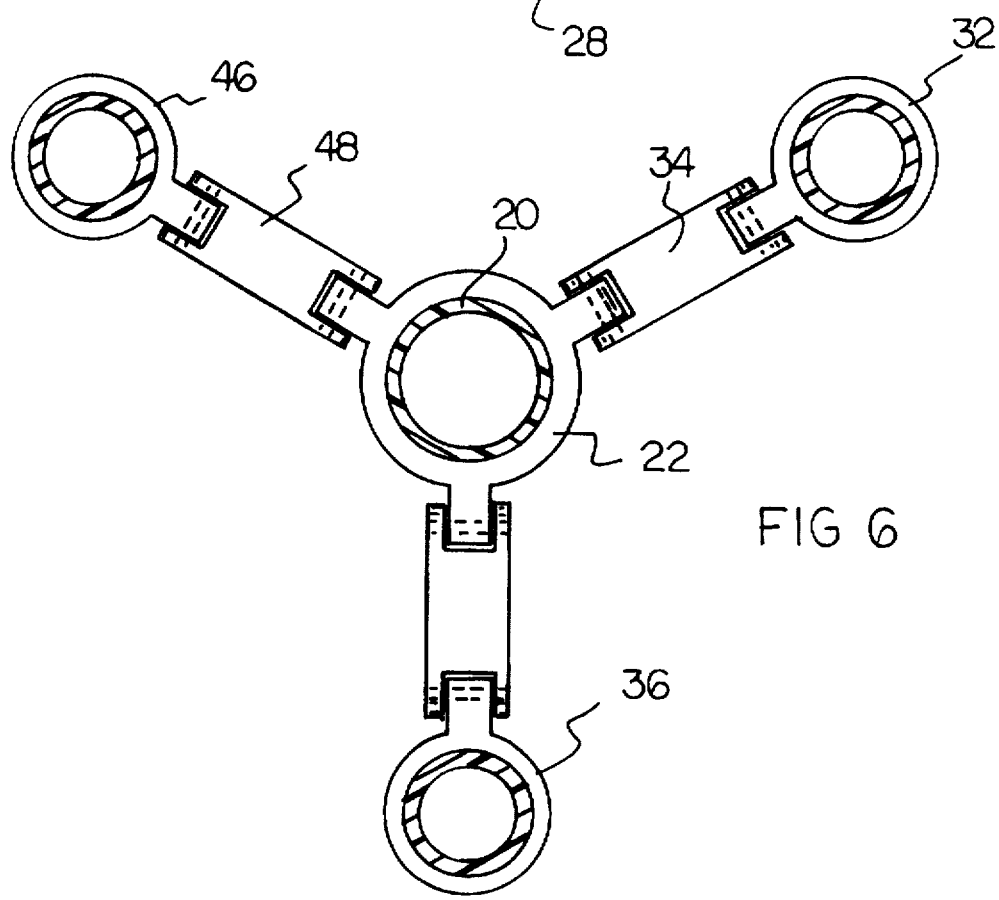

HUNTING TRIPOD

BACKGROUND OF THE INVENTION

1. Field of the Invention

The present invention relates to hunting tripod and more particularly pertains to adjustable tripod for use in hunting.

2. Description of the Prior Art

The use of adjustable tripods is known in the prior art. More specifically, adjustable tripods heretofore devised and utilized for the purpose of means for adjusting a tripod are known to consist basically of familiar, expected, and obvious structural configurations, notwithstanding the myriad of designs encompassed by the crowded prior art which has been developed for the fulfillment of countless objectives and requirements.

By way of example U.S. Pat. No. 5,072,910 to May discloses an adjustable tripod stand. U.S. Pat. No. 740,886 to Marten discloses a stand or support for horns. U.S. Pat. No. 2,864,577 to Du Mais discloses a foldable standard base structure. U.S. Pat. No. 3,312,432 to Pfeiffer discloses a mobile stand. U.S. Pat. No. 3,780,974 to Takahashi disclose the sliding pole of a portable motion picture stand. U.S. Pat. No. 773,787 to Crossman discloses a supporting device for clothes horses. U.S. Pat. No. 1,894,695 to Ley discloses a tripod construction. Lastly, U.S. Pat. No. 4,557,451 to Conway discloses binocular rests.

In this respect, the hunting tripod according to the present invention substantially departs from the conventional concepts and designs of the prior art, and in doing so provides an apparatus primarily developed for the purpose of adjustable tripod for use in hunting.

Therefore, it can be appreciated that there exists a continuing need for new and improved hunting tripod which can be used for adjustable tripod for use in hunting. In this regard, the present invention substantially fulfills this need.

SUMMARY OF THE INVENTION

The present application is an improvement over patent application Ser. No. 165,420 now U.S. Pat. No. 5,402,595.

In view of the foregoing disadvantages inherent in the known types of adjustable tripods now present in the prior art, the present invention provides an improved hunting tripod. As such, the general purpose of the present invention, which will be described subsequently in greater detail, is to provide a new and improved hunting tripod and method which has all the advantages of the prior art and none of the disadvantages.

To attain this, the present invention essentially comprises a mounting device for use in conjunction with a firearm, the mounting device including a cylindrical main shaft having an upper extent, a lower extent and an intermediate extent therebetween, a ring brace secured to the lower extent of the main shaft. A bipod assembly having a bipod slider ring slidably positioned upon the cylindrical main shaft, a first bipod leg having an upper extent, a lower extent and an intermediate extent therebetween, the upper extent of the first bipod leg pivotally secured to the bipod slider ring. A second bipod leg having an upper extent, a lower extent and an intermediate extent therebetween, the upper extent of the second bipod leg pivotally secured to the bipod slider ring at a location opposite of the upper extent of the first bipod leg, a first leg brace slider ring slidably positioned upon the first bipod leg, a first leg brace having a first end pivotally secured to the first leg brace slider ring and a second end pivotally secured to the ring brace, a second leg brace slider ring slidably positioned upon the second bipod leg, a second leg brace having a first end pivotally secured to the second leg brace slider ring and a second end pivotally secured to the ring brace. A retracted orientation defined by the bipod slider ring being positioned at the upper extent of the main shaft, an extended orientation defined by the bipod slider ring being positioned adjacent the lower extent of the main shaft. A tripod assembly having a tripod slider ring slidably positioned upon the main shaft at a location above the bipod slider ring, a tripod leg having an upper extent, a lower extent and an intermediate extent therebetween, the upper extent of the tripod leg being pivotally secured to the tripod slider ring, a leg brace slider ring being slidably secured upon the tripod leg, a leg brace having a first end pivotally secured to the leg brace slider ring and a second end pivotally secured to the ring brace. A retracted orientation defined by the tripod slider ring being positioned at the upper extent of the main shaft, and an extended orientation defined by the tripod slider ring being positioned at the lower extent of the main shaft. A firearm mounting means secured to the upper extent of the main shaft. The mounting means comprises a ball portion extending upwardly from the upper extend of the main shaft, an interconnection piece having a lower socket opening and an upper supporting shaft, the ball rotatably secured within the lower socket opening of the interconnection piece. A vise member which has a first L-shaped member and a second L-shaped member with an intermediate element slidably interconnecting the two L-shaped members, adjustment means to effects movement of the second L-shaped member away from the first L-shaped member. A first C-shaped retaining element secured to the first L-shaped member, a second C-shaped retaining element secured to the second L-shaped member, a firearm securing strap having a first end and a second end and an intermediate extent therebetween, a first pair of rubber stops slidably positioned upon the first end of the strap, a second pair of rubber stops slidably positioned upon the second end of the strap, the first pair of stops being positioned on opposite ends of the first C-shaped retaining member to thereby secure the first end of the strap to the first C-shaped retaining member, the second pair of stops being positioned on opposite ends of the second C-shaped regaining member to thereby secure the second end of the strap to the second C-shaped retaining member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved hunting tripod which have all the advantages of the prior art adjustable tripods and none of the disadvantages.

It is another object of the present invention to provide new and improved hunting tripod which may be easily and efficiently manufactured and marketed.

It is further object of the present invention to provide new and improved hunting tripod which are of durable and reliable constructions.

An even further object of the present invention is to provide new and improved hunting tripod which are susceptible of a low cost of manufacture with regard to both materials and labor, and which accordingly are then susceptible of low prices of sale to the consuming public, thereby making such hunting tripod economically available to the buying public.

Still yet another object of the present invention is to provide new and improved hunting tripod which provide in the apparatuses and methods of the prior art some of the advantages thereof, while simultaneously overcoming some of the disadvantages normally associated therewith.

Even still another object of the present invention is to adjustable tripod for use in hunting.

Lastly, it is an object of the present invention to provide new and improved tripod assembly for use in conjunction with a firearm. However, the present invention could also be used in conjunction with any other instrument which require precise mounting upon a portable and easily erectable apparatus. In its broadest context, the present invention includes a tripod comprised of a bipod member and a tripod member. In this manner, of the present invention can be employed with either two or three legs. Furthermore, the tripod of the present invention also includes a vice type mounting member which allows the tripod to be used in conjunction with a variety of firearms.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the hunting tripod constructed in accordance with the principles of the present invention.

FIG. 2 is a view taken along line 2—2 of FIG. 1.

FIG. 5 is a view taken along line 5—5 of FIG. 1.

FIG. 6 is a view taken along line 6—6 of FIG. 1.

FIG. 5 is a view of the device with both the tripod assembly and the bipod assembly in their extended orientations.

The same reference numerals refer to the same parts through the various Figures.

DESCRIPTION OF THE PREFERRED EMBODIMENT

Figure 3:
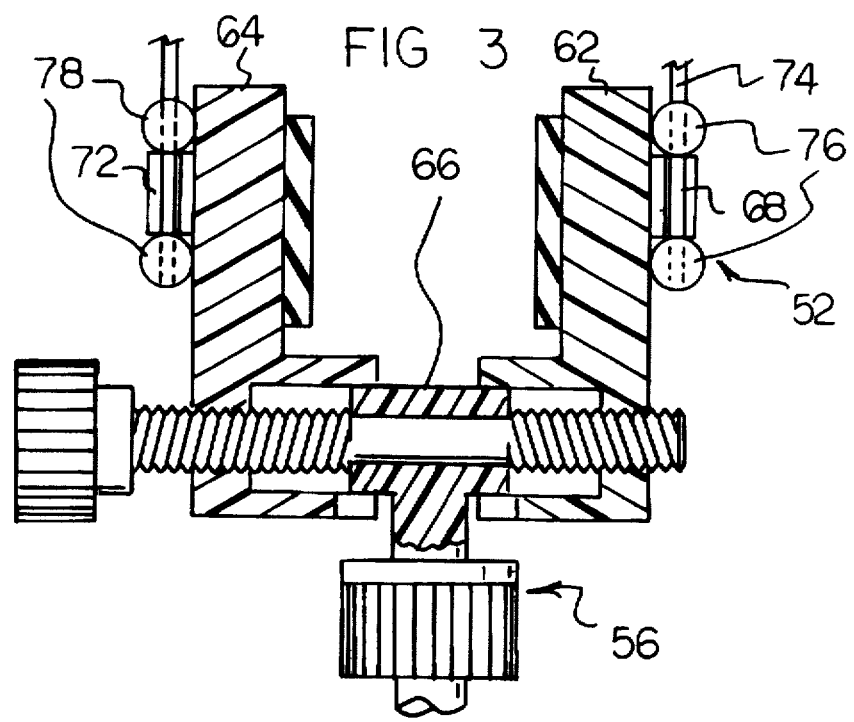
FIG. 3 is a view taken along line 3—3 of FIG. 2.
Figure 4:
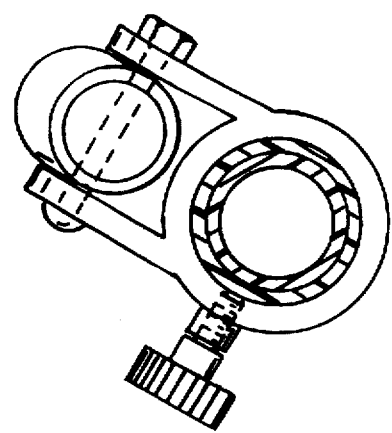
FIG. 4 is a view taken along line 4—4 of FIG. 1.
Figure 7:
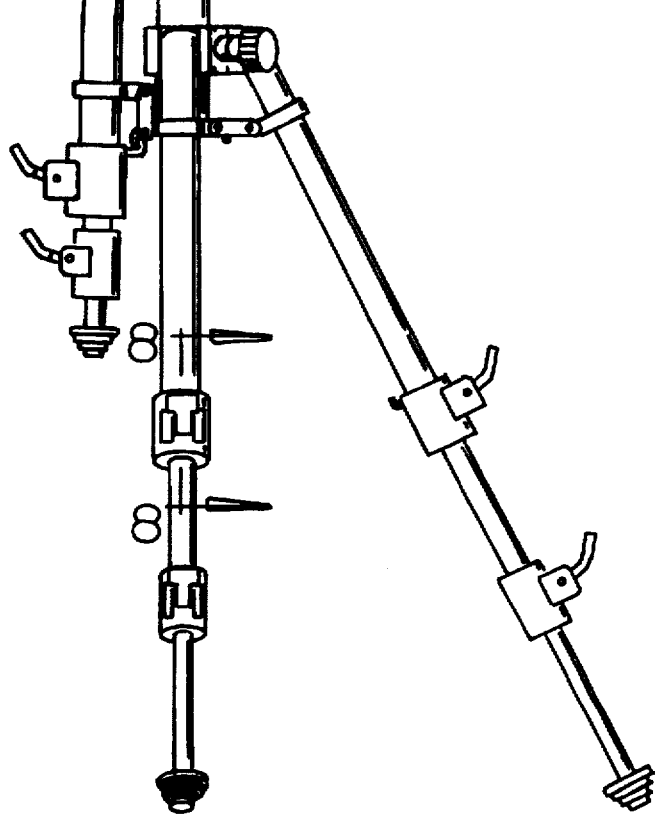
FIG. 7 is a view of the tripod in use.
Figure 8:
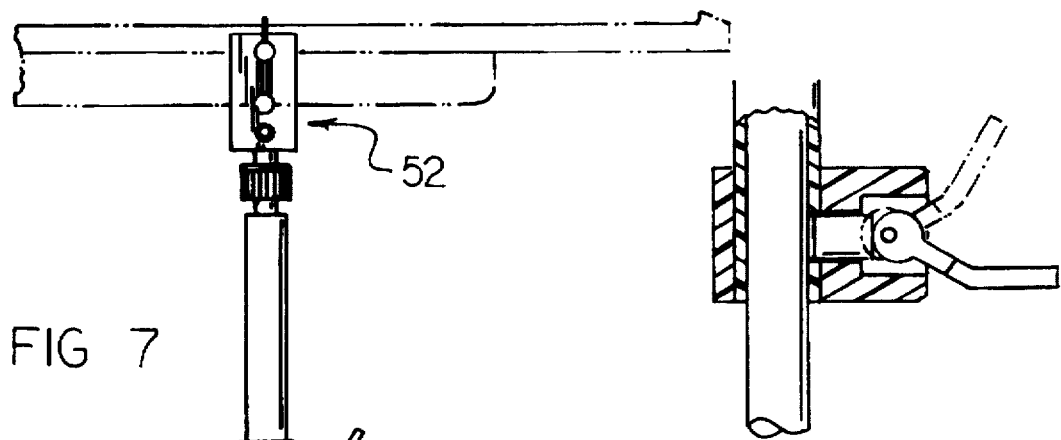
FIG. 8 is a view taken along line 8—8 of FIG. 7.
Figure 9:
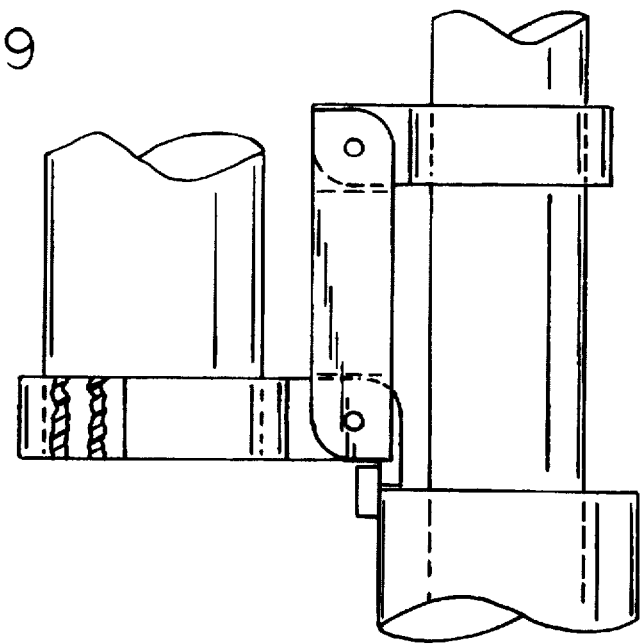
FIGS. 9 and 10 are view of the legs in their unfolded and folded orientations respectively.
Figure 10:
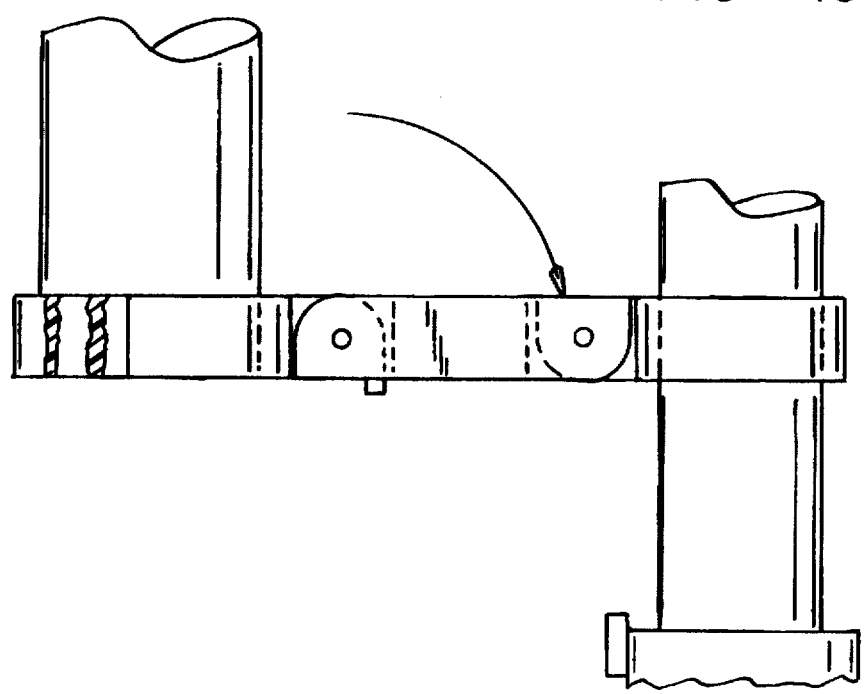

With reference now to the drawings, and in particular to FIG. 1 thereof, the preferred embodiment of the new and improved hunting tripod embodying the principles and concepts of the present invention and generally designated by the reference numeral 10 will be described.

The present invention relates to a tripod device, or mounting device, for use in conjunction with a firearm. However, the present invention could also be used in conjunction with any other instrument which require precise mounting upon a portable and easily erectable apparatus. In its broadest context, the present device includes a tripod comprised of a bipod member and a tripod member. In this manner, of the present invention can be employed with either two or three legs. Furthermore, the tripod device of the present invention also includes a vice type mounting member which allows the tripod to be used in conjunction with a variety of firearms. The various components of the present invention, and the manner in which they interrelate, will be described in greater detail hereinafter.

The major component of the present device 10 is the cylindrical main shaft 20. This main shaft 20 is defined by an upper extent, a lower extent and an intermediate extent therebetween. Furthermore, a ring brace 22 is secured to the lower extent of the main shaft 20. All of these elements are illustrated in FIGS. 1 and 2.

Another component of the assembly of the present invention is the bipod assembly. This bipod assembly is illustrated in both FIG. 1 and 2. The bipod assembly includes a bipod slider ring 24 which is slidably positioned upon the cylindrical main shaft 20. Additionally, the bipod slider ring 24 includes a first and second bipod leg. The first bipod leg 26 is defined by an upper extent, a lower extent and an intermediate extent therebetween, with the upper extent of the first bipod leg 26 pivotally secured to the bipod slider ring 24. The relationship between the first bipod leg 26 and the first bipod slider ring 24 can most clearly be seen in reference to FIGS. 1 and 2. Likewise, the bipod assembly includes a second bipod leg 28 which is defined by an upper extent, a lower extent and an intermediate extent therebetween. Again, the upper extent of the second bipod leg 28 is pivotally secured to the bipod slider ring 24 at a location opposite of the upper extent of the first bipod leg 26. Further still, the first bipod assembly includes a first and second leg brace slider rings and associated leg braces. The details as to these components, and the manner in which they interrelate will be described hereinbelow. The first leg brace slider ring 32 is slidably positioned upon the first bipod leg 26. Furthermore, the first leg brace 34 includes a first end pivotally secured to the first leg brace slider ring 32 and a second end pivotally secured to the ring brace 22. In a similar fashion, the second leg brace slider ring 36 is slidably positioned upon the second bipod leg 28. Furthermore, the second leg brace 38 includes a first end pivotally secured to the second leg brace slider ring 36 and a second end pivotally secured to the ring brace 22.

With the bipod assembly having the above described construction at least two distinct orientations are possible. More specifically: the bipod assembly includes a retracted orientation defined by the bipod slider ring 24 being positioned at the upper extent of the main shaft 20 and the first and second bipod legs drawn in proximate to the main shaft 20; and an extended orientation defined by the bipod slider ring 24 being positioned adjacent the lower extent of the main shaft 20 and the first and second bipod legs being positioned away from the main shaft 20.

The tripod assembly will next be described, the tripod assembly includes a tripod slider ring 42 which is slidably positioned upon the main shaft 20 at a location above the bipod slider ring 24. Additionally, the tripod assembly includes a tripod leg 44 which is defined by an upper extent, a lower extent and an intermediate extent therebetween. The upper extent of this tripod leg 44 is pivotally secured to the tripod slider ring 42. Furthermore, the tripod assembly includes a leg brace slider ring 46 which is slidably secured upon the tripod leg 44, and an associated leg brace 48. The leg brace 48 of the tripod assembly is defined by a first end pivotally secured to the leg brace slider ring 46 and a second end pivotally secured to the ring brace 22.

Thus, as with the bipod assembly, the tripod assembly has at least two different orientations. Specifically: a retracted orientation defined by the tripod slider ring 42 being positioned at the upper extent of the main shaft 20 and the tripod leg 44 positioned proximate to the main shaft 20; and an extended orientation wherein the tripod slider ring 42 is positioned at the lower extent of the main shaft 20 and the tripod leg 44 is extended away from the main shaft 20.

As is appreciated from the various figures, the tripod slider ring 42 is at a positioned above the bipod slider ring 24 upon the main shaft 20. Thus, a user who wishes to deploy the tripod assembly to its extended orientation can only do so after the bipod slider assembly has been extended to its extended orientation.

A firearm mounting means 52 (FIG. 3) is secured to the upper extent of the main shaft 20 by way of a ball and socket connection. This firearm mounting means 52 will next be described. This firearm mounting means 52 includes a ball portion 54 (FIG. 2) which extends upwardly from the upper extend of the main shaft 20 of the device 10. An interconnection piece 56 is included which has a lower socket opening and an upper supporting shaft. The interconnection piece 56 is comprised of a first and second half which come together to define the lower socket opening. Thus, when the two halves are sufficiently close to one another a ball is adapted to be rotatably secured within the lower socket opening of the interconnection piece 56. This interconnection piece 56 is illustrated in both FIGS. 1, 2, and 3.

A vise member 58 is integral with and positioned above the interconnection piece 56. This vise member 58 is comprised of a first L-shaped member 62, which is integral with the first half of the interconnection piece 56; and a second L-shaped member 64 which is integral with the second half of the interconnection piece 56. An intermediate element 66 serves to interconnect the first and second L-shaped member as well as the first and second halves of the interconnection piece 56. This intermediate element 66 is slidably interconnected within two L-shaped members. More specifically, a threaded interconnection element is internal to the two L-shaped members and to the intermediate element 66. Furthermore, the threaded adjustment element is secured one of the L-shaped members such that rotation of the adjustment element effects movement of the second L-shaped member 64 away from the first L-shaped member 62. Thus, via the threaded adjustment element and an associated adjustment knob, the spacing between the two L-shaped members, as well as between the two interconnection pieces can be selected. Thus, what has been described is adjustment means to effect the movement of one L-shaped member away from the other.

The vise member 58 also includes a first C-shaped retaining element 68 secured to the first L-shaped member 62, a second C-shaped retaining element 72 secured to the second L-shaped member 64. These C-shaped member will facilitate the securement of a firearm to the tripod device 10 in a manner herein described. A firearm securing strap 74 is associated with the vise member 58, with the strap 74 having a first end and a second end and an intermediate extent therebetween. A first pair of rubber stops 76 are slidably positioned upon the first end of the strap 74, and a second pair of rubber stops 78 are slidably positioned upon the second end of the strap 74. The first pair of stops 76 are positioned on opposite ends of the first C-shaped retaining member to thereby secure the first end of the strap 74 to the first C-shaped retaining member. In a similar fashion, the second pair of stops 78 are positioned on the opposite ends of the second C-shaped regaining member to thereby secure the second end of the strap 74 to the second C-shaped retaining member. As can be appreciated, the strap 74 is employed in securing a firearm to the vise member 58. Furthermore, with the arrangement thus described provides an infinite range of adjustment so much as the two sets of stops are slibably positioned upon the strap 74.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mounting device for use in conjunction with a firearm, the mounting device comprising in combination:

a cylindrical main shaft having an upper extent, a lower extent and an intermediate extent therebetween, a ring brace secured to the lower extent of the main shaft;

a bipod assembly having a bipod slider ring slidably positioned upon the cylindrical main shaft, a first bipod leg having an upper extent, a lower extent and an intermediate extent therebetween, the upper extent of the first bipod leg pivotally secured to the bipod slider ring, a second bipod leg having an upper extent, a lower extent and an intermediate extent therebetween, the upper extent of the second bipod leg pivotally secured to the bipod slider ring at a location opposite of the upper extent of the first bipod leg, a first leg brace slider ring slidably positioned upon the first bipod leg, a first leg brace having a first end pivotally secured to the first leg brace slider ring and a second end pivotally secured to the ring brace, a second leg brace slider ring slidably positioned upon the second bipod leg, a second leg brace having a first end pivotally secured to the second leg brace slider ring and a second end pivotally secured to the ring brace, a retracted orientation defined by the bipod slider ring being positioned at the upper extent of the main shaft, an extended orientation defined by the bipod slider ring being positioned adjacent the lower extent of the main shaft;

a tripod assembly having a tripod slider ring slidably positioned upon the main shaft at a location above the bipod slider ring, a tripod leg having an upper extent, a lower extent and an intermediate extent therebetween, the upper extent of the tripod leg being pivotally secured to the tripod slider ring, a leg brace slider ring being slidably secured upon the tripod leg, a leg brace having a first end pivotally secured to the leg brace slider ring and a second end pivotally secured to the ring brace, a retracted orientation defined by the tripod slider ring being positioned at the upper extent of the main shaft, and an extended orientation defined by the tripod slider ring being positioned at the lower extent of the main shaft;

a firearm mounting means secured to the upper extent of the main shaft, the mounting means comprises a ball portion extending upwardly from the upper extend of the main shaft, an interconnection piece having a lower socket opening and an upper supporting shaft, the ball rotatably secured within the lower socket opening of the interconnection piece;

a vise member having a first L-shaped member and a second L-shaped member with an intermediate element slidably interconnecting the two L-shaped members, adjustment means to effects movement of the second L-shaped member away from the first L-shaped member;

a first C-shaped retaining element secured to the first L-shaped member, a second C-shaped retaining element secured to the second L-shaped member, a firearm securing strap having a first end and a second end and an intermediate extent therebetween, a first pair of rubber stops slidably positioned upon the first end of the strap, a second pair of rubber stops slidably positioned upon the second end of the strap, the first pair of stops being positioned on opposite ends of the first C-shaped retaining member to thereby secure the first end of the strap to the first C-shaped retaining member, the second pair of stops being positioned on opposite ends of the second C-shaped regaining member to thereby secure the second end of the strap to the second C-shaped retaining member.

2. A mounting device for use in conjunction with a firearm, the mounting device comprising in combination:

a main shaft having an upper extent, a lower extent and an intermediate extent therebetween, a ring brace secured to the lower extent of the main shaft;

a bipod assembly having a bipod slider ring slidably positioned upon the cylindrical main shaft, a first bipod leg having an upper extent, a lower extent and an intermediate extent therebetween, the upper extent of the first bipod leg pivotally secured to the bipod slider ring, a second bipod leg having an upper extent, a lower extent and an intermediate extent therebetween, the upper extent of the second bipod leg pivotally secured to the bipod slider ring at a location opposite of the upper extent of the first bipod leg, a first leg brace slider ring slidably positioned upon the first bipod leg, a first leg brace having a first end pivotally secured to the first leg brace slider ring and a second end pivotally secured to the ring brace, a second leg brace slider ring slidably positioned upon the second bipod leg, a second leg brace having a first end pivotally secured to the second leg brace slider ring and a second end pivotally secured to the ring brace, a retracted orientation defined by the bipod slider ring being positioned at the upper extent of the main shaft, an extended orientation defined by the bipod slider ring being positioned adjacent the lower extent of the main shaft;

a tripod assembly having a tripod slider ring slidably positioned upon the main shaft at a location above the bipod slider ring, a tripod leg having an upper extent, a lower extent and an intermediate extent therebetween, the upper extent of the tripod leg being pivotally secured to the tripod slider ring, a leg brace slider ring being slidably secured upon the tripod leg, a leg brace having a first end pivotally secured to the leg brace slider ring and a second end pivotally secured to the ring brace, a retracted orientation defined by the tripod slider ring being positioned at the upper extent of the main shaft, and an extended orientation defined by the tripod slider ring being positioned at the lower extent of the main shaft;

a firearm mounting means secured to the upper extent of the main shaft by way of a ball and socket connection.

3. The mounting device as described in claim 1 wherein:

the firearm mounting means comprises a ball portion extending upwardly from the upper extend of the main shaft, an interconnection piece having a lower socket opening and an upper supporting shaft, the ball rotatably secured within the lower socket opening of the interconnection piece;

a vise member having a first L-shaped member and a second L-shaped member with an intermediate element slidably interconnecting the two L-shaped members, adjustment means to effects movement of the second L-shaped member away from the first L-shaped member;

a first C-shaped retaining element secured to the first L-shaped member, a second C-shaped retaining element secured to the second L-shaped member, a firearm securing strap having a first end and a second end and an intermediate extent therebetween, a first pair of rubber stops slidably positioned upon the first end of the strap, a second pair of rubber stops slidably positioned upon the second end of the strap, the first pair of stops being positioned on opposite ends of the first C-shaped retaining member to thereby secure the first end of the strap to the first C-shaped retaining member, the second pair of stops being positioned on opposite ends of the second C-shaped regaining member to thereby secure the second end of the strap to the second C-shaped retaining member.

* * * * *